Oct. 28, 1941.  J. D. WICKS  2,261,098

AUTOMOBILE OIL FILTER

Filed July 10, 1939

Inventor
John D. Wicks
Attorney

Patented Oct. 28, 1941

2,261,098

UNITED STATES PATENT OFFICE 2,261,098

AUTOMOBILE OIL FILTER

John D. Wicks, Providence, R. I., assignor to Accessories Corporation, Gastonia, N. C., a corporation of North Carolina Application July 10, 1939, Serial No. 283,653

8 Claims. (Cl. 210—131)

The invention relates to a lubricating oil filter for automobile and other internal combustion engines.

An object of the present invention is to provide a lubricating oil filter designed to be permanently mounted on the oil filter tube or inlet of an internal combustion engine and equipped with a removable oil filtering cartridge and having a passage leading directly to the internal combustion engine, so that fresh oil may be supplied to the oil sump of an internal combustion engine without removing the filter from the oil filler tube or inlet and without filtering the fresh oil.

Heretofore oil filters have been applied to the filler tube of the internal combustion engine of an automobile, but it has been necessary when fresh oil is to be supplied to the engine to remove the filter from the filler tube of the engine in order to expose the filler tube for supplying the fresh oil. The present invention enables the oil filter to be mounted permanently on the filler tube or oil inlet of an engine and obviates the necessity of detaching the filter each time fresh oil is supplied to the engine.

Another object of the invention is to provide a lubricating oil filter having a fresh oil inlet adapted to receive the air filtering breather cap supplied on the engine as standard factory equipment by original manufacturer, so that the filter will not interfere with the usual functioning of oil systems having such breather caps and will enable such breather caps to be removed and replaced in the usual manner when it becomes necessary or desirable to supply an engine with fresh oil.

It is also an object of the invention to provide an oil filter equipped at the bottom with a removable sump-forming member adapted to support the cartridge in an elevated position above the bottom of the casing and arranged to receive sediment and other accumulation and capable, when a cartridge is removed, of being readily removed and emptied of such sediment.

With these and other objects in view, the invention consists in the construction and novel combination and arrangement of parts hereinafter fully described, illustrated in the accompanying drawing and pointed out in the claims hereto appended, it being understood that various changes in the form, proportions and minor details of construction may be resorted to without departing from the spirit or sacrificing any of the advantages of the invention.

In the drawing:

Figure 1 is a side elevation of an automobile oil filter constructed in accordance with this invention and shown applied to a portion of an automobile engine.

Figure 2 is a vertical sectional view taken on the line 2—2 of Figure 1.

Figure 3 is a horizontal sectional view taken on the line 3—3 of Figure 2.

Figure 4 is an enlarged detail sectional view of a portion of the oil filtering cartridge illustrating the means for securing the outer fabric covering to the inner perforated tube.

Figure 5 is a detail perspective view of the removable sediment receiving member which supports the oil filtering cartridge and forms a sump at the bottom of the filter.

In the accompanying drawing in which is illustrated the preferred embodiment of the invention, the lubricating oil filter which is designed to be permanently mounted on the engine 1 of an automobile or other motor vehicle may, of course, be advantageously employed on any internal combustion engine. The engine 1 is provided with an upwardly extending filler tube 2 and the air filtering breather cap which is ordinarily mounted on the upper end of the filler tube 2 is removed therefrom and, as hereinafter fully explained, is applied to the oil filter of the present invention, which is adapted to be readily installed on various types of internal combustion engines and to be used in connection with the lubricating system of various automobiles without interfering with the normal accustomed operation of the same.

The oil filter comprises in its construction a suitable container or casing consisting of a shell of suitable material and preferably comprising an open-top cylindrical body 4 and a cover 5 which is preferably in the form of a cap, a gasket 6 of suitable material being preferably interposed between the lower edge of the cap and the upper edge of the body portion 4. The upper edge of the body portion is outwardly offset to provide an interior annular seat 7 to receive the gasket 6 which is preferably in the form of a flat ring and which forms an air- and oil-tight joint or connection when the cover or cap 5 of the body is secured in place as hereinafter fully explained.

The body of the casing is provided at the bottom with a central outlet opening, from which depends a short tube 8 which is preferably fitted inside the upper portion of the filler tube 2. Around the outside of the filler tube 2 is fitted a clamp 9, which is composed of two approximately semi-cylindrical sections 10 having outturned terminals 11 connected by bolts 12 which firmly clamp the sections 10 around the filler tube 2. The tube 8 is tightly fitted inside the filler tube, by means of shims or bushings, and it may be permanently attached to the same by any suitable means and it may also be readily removable therefrom as illustrated in the accompanying drawing.

The sections 10 of the clamp are provided with outwardly extending horizontal arms 13, which at their outer ends support bolts 14 for securing the lower ends of vertical rods 15 to the arms 13 of the clamp. The upper ends 16 of the rods 15 are threaded and extend through openings 17 of ears 18 of the cap 5 which forms the top of the filter casing. The upper threaded ends 16 of the rods 15 are equipped with thumb nuts 19 which enable the cap 5 to be drawn tightly into engagement with the gasket 6, whereby the top 5 of the casing is firmly secured to the body 4 thereof and an air-tight and an oil-tight joint or connection maintained between the said parts.

The rods 15 and the nuts 19 provide a detachable connection for the cap or cover of the casing and enable the cap or cover to be readily detached for enabling an oil filtering cartridge 20 to be readily removed and replaced by a new cartridge when the same becomes necessary or desirable. Any other suitable means may, however, be employed for detachably securing the top or cover of the casing to the body thereof. The body 4 of the casing is provided with a central vertical tube 21 extending upwardly from the bottom opening and preferably forming a continuation of the short depending tube 8 and provided with openings 22 for the passage of filtered oil to permit such oil after passing through the cartridge or filtering unit to return to the oil sump (not shown) of the internal combustion engine 1. The central vertical tube 21 extends to the top of the casing and it forms a passage to permit fresh oil to be delivered directly to the engine without being filtered when the breather cap 3 is removed from the top of the filter.

The cap 5 of the casing is provided with a central inlet opening and it has a short depending tubular portion 23 extending downwardly from the opening and receiving the lower tubular portion 38 of the adaptor 39 having an upper tubular portion 40 of a diameter to receive snugly the tubular member 24 of the air filtering breather cap supplied on the engine as standard factory equipment by the original manufacturer, so that when the oil filter of the present invention is applied to the filler tube of an automobile, the breather cap which is removed from the filler tube 2 may be placed on top of the filter, which will not interfere with the functioning of the air filtering breather cap and which will permit fresh oil to be supplied directly to the engine by simply removing the air filtering breather cap and without filtering the fresh oil. The upper tubular portion 40 of the adaptor 39 is connected by a horizontal annular web portion 41 with the lower tubular portion 38. The intermediate connecting portion or web 41 is seated upon the exterior of the top 5 of the filter casing and the upper tubular portion may be made of any diameter, and adaptors 39 may in this respect differ in many installations, so that the filler pipe breather cap originally supplied with an engine can be firmly attached to the filter, thus requiring no change in the breather system efficiency from car manufacturers' specifications.

The casing 4 is provided at one side with a nipple 25 and is connected by a coupling 26 with the upper end of a tube 27, which supplies oil under pressure to the filter. The lower end of the tube 27 is connected by a coupling 28 with a part of the oil pressure line of the engine or mechanism and the oil pressure in the system is sufficient to force the oil up through the tube 27 and through the filtering unit or cartridge.

The filtering unit or cartridge comprises a central tube 29 provided at intervals with perforations 30 and having filtering material 31 retained on it by an outer covering 32 preferably consisting of loosely woven fabric. The filtering medium may be of any preferred material and the outer covering 32, which may also be made of any suitable material, is preferably in tubular form and extends over the top and down the sides and under the bottom of the filtering medium. Each end of the tubular outer covering is clamped to one edge of the perforated tube 29 by means of a resilient ring 33 composed of two sides and a connecting portion and embracing the contiguous edge of the tube 29 and the marginal portion of the covering 32 of the filtering cartridge. The tube 29 of the filtering cartridge is of a diameter to fit loosely over the vertical tube 21, and the filtered oil, after being subjected to the action of the filtering medium, passes through the perforations 30 of the tube 29 and the openings 22 of the tube 21 and returns to the engine through the passage afforded by the filler tube.

The filtering medium is arranged to form a depth filter in contradistinction to a surface filter and the cartridge or unit is preferably supported in a slightly elevated position above the bottom of the casing by a sump-forming element 34 preferably consisting of a horizontal disk-shaped bottom 35 and inner and outer annular walls 36 and 37. The bottom 35 is provided with a central opening through which the vertical tube 21 passes, and the inner annular wall 36 extends upwardly from the central opening in the bottom 35 and is removably fitted on the upstanding tube 21 and receives and supports the cartridge or filtering unit. The perforated tube 29 of the filtering unit is preferably located substantially directly above the inner wall 36 of the sump-forming member 34 and the outer wall 37 of said member 34 preferably fits snugly within the cylindrical body portion 4 of the filter casing, so that sediment collected on the exterior of the cartridge may not pass between the wall 37 and the body of the filter casing and thereby pass back into the oil sump of the engine, but will be collected in the sump formed by the member 34 and settle therein.

The detachable sump member 34 will enable sediment to be readily removed from the filter casing. While a central vertical upstanding tube 21 is illustrated in Figure 2 of the drawing, such tube may, if desired, be omitted, as the central perforated tube of the cartridge or filtering unit will form a central passage for enabling fresh oil without filtering to pass directly to the engine when it is desired to supply the same with such oil. Also the sump-forming member 34 which supports the cartridge or filtering unit in a slightly elevated position above the bottom of the filter casing may be of any other preferred form.

What is claimed is:

1. A filter of the class described comprising a casing having a side wall and provided at its top with a fresh oil inlet and having an outlet at its bottom, said casing being provided at the bottom thereof with a depending tube adapted to be mounted in the filler tube of an engine, said casing being also provided with a vertical tube extending upwardly from the bottom opening to a point adjacent the top of the casing in alignment with the fresh oil inlet and having openings extending through the wall thereof, means for clamping the casing of the filter to the filler tube of an engine, a filter unit disposed within the casing and surrounding said vertical tube, said unit being spaced from the side wall of the casing, a conduit communicating with the space existing between the unit and said side wall for introducing oil under pressure into the casing for filtering the same radially inwardly through said unit.

2. A filter of the class described, including a casing having side walls and provided at its top with a fresh oil inlet and having an oil outlet at the bottom, said casing being provided at the bottom with a depending tube registering with the outlet and adapted to be mounted in the filler tube of an engine, said casing being also provided with a perforate vertical tube extending upwardly from the bottom opening a point adjacent the top of the casing, means for attaching the casing of the filter on the filler tube of an engine, a filter unit arranged within the casing and surrounding the said vertical tube, said unit being spaced from the side walls of the casing, a conduit communicating with the space existing between the unit and said side walls for introducing oil under pressure into the casing for filtering the same radially inwardly through said unit, and a sump forming member arranged within the casing around the upwardly extending tube and supporting the filtering unit and having a trough located beneath the filtering unit and constituting a sediment sump.

3. A filter of the class described, including a casing comprising a body portion having a bottom outlet and a cap fitted on the casing and provided at the top with a fresh oil inlet for the casing, a filtering unit arranged within the casing, a conduit communicating with the interior of the casing exteriorly of the filtering unit for introducing oil under pressure into the casing for filtering the same through the unit, said casing being also provided with a passage extending from the oil inlet to the bottom outlet to enable fresh oil to be supplied to an engine without filtering and without removing the filter from the filler tube of an engine, a clamp adapted to be mounted on the filler tube of the engine, and adjustable means extending from the clamp and connected with the cap for securing the same on the body portion of the casing and at the same time securing both the cap and the body portion of the casing to the filler tube.

4. A filter of the class described, including a casing having a fresh oil inlet at the top thereof and provided at its bottom with an oil outlet, an oil filtering unit disposed within the casing and having a passageway for oil extending therethrough in registry with both the inlet and the outlet, there being an opening in the side wall of the casing for the introduction of oil under pressure into the casing for filtering through said unit.

5. A filter of the class described, including a casing having a fresh oil inlet at the top thereof and provided at its bottom with an oil outlet, an oil filtering unit disposed within the casing and having a passageway for oil extending therethrough in registry with both the inlet and the outlet, said unit being spaced from the walls of the casing, there being an opening in the side wall of the casing for the introduction of oil under pressure into the space within the casing surrounding the filter unit.

6. In a filter of the class described, a casing having an open upper end, side walls and a bottom provided with an oil outlet, a tube depending from the bottom in registry with the outlet and designed for insertion into the filler tube of an internal combustion engine, a filter unit disposed within the casing and spaced from the side walls thereof, a cover for the casing having a filling opening therein and closing the upper open end of the casing, a clamp designed for attachment to said filler tube, tension means connecting the clamp and cover, said tension means comprising the sole means for retaining the cover on said casing, and a conduit communicating with the space existing between said unit and said side walls for introducing oil under pressure into the casing for filtering the same through said unit.

7. A filter of the class described, including a casing having side walls and a fresh oil inlet at the top thereof and provided at its bottom with an oil outlet, means for connecting said oil outlet to the filling tube of an internal combustion engine, a perforate tube in registry with the oil outlet and extending upwardly therefrom to a point adjacent the top of the casing and in registry with the oil inlet, a filter unit disposed within the casing and surrounding the perforate tube and spaced from the walls of the latter and from the side walls of the casing, a conduit communicating with the space existing between the filter unit and said side walls for introducing oil under pressure into said casing for filtering the same radially inwardly through said unit.

8. A filter of the class described including a casing having side walls and having a fresh oil inlet at the top thereof and provided at its bottom with an oil outlet, an oil filtering unit disposed within the casing and having a passageway for oil extending therethrough in registry with both the inlet and the outlet, said unit being spaced from the side walls of the casing, there being an opening in said casing communicating with the space existing between said unit and said side walls, and a conduit communicating with said opening for the introduction of oil under pressure into the casing for filtering the same radially inwardly through said unit.

JOHN D. WICKS.